US008787715B2

(12) United States Patent
Hung

(10) Patent No.: US 8,787,715 B2
(45) Date of Patent: Jul. 22, 2014

(54) OPTICAL COUPLING LENS

(71) Applicant: Hon Hai Precision Industry Co., Ltd., New Taipei (TW)

(72) Inventor: Yi Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/726,671

(22) Filed: Dec. 26, 2012

(65) Prior Publication Data

US 2014/0099056 A1 Apr. 10, 2014

(30) Foreign Application Priority Data

Oct. 8, 2012 (TW) ............................. 101137120 A

(51) Int. Cl.
*G02B 6/32* (2006.01)
*G02B 6/34* (2006.01)

(52) U.S. Cl.
USPC ............................................. 385/33; 385/36

(58) Field of Classification Search
None
See application file for complete search history.

(56) References Cited

U.S. PATENT DOCUMENTS

| | | | | |
|---|---|---|---|---|
| 5,515,468 | A * | 5/1996 | DeAndrea et al. | 385/88 |
| 5,742,720 | A * | 4/1998 | Kobayashi et al. | 385/89 |
| 6,888,988 | B2 * | 5/2005 | Vancoille et al. | 385/47 |
| 6,947,671 | B2 * | 9/2005 | Sekiya et al. | 398/86 |
| 6,956,995 | B1 * | 10/2005 | Shafaat et al. | 385/39 |
| 7,198,416 | B2 * | 4/2007 | Ray et al. | 385/93 |
| 7,369,328 | B2 * | 5/2008 | Yamamoto et al. | 359/726 |
| 7,556,440 | B2 * | 7/2009 | Birincioglu et al. | 385/93 |
| 7,630,593 | B2 * | 12/2009 | Furuno et al. | 385/14 |
| 8,457,457 | B2 * | 6/2013 | Morioka | 385/33 |
| 8,554,030 | B2 * | 10/2013 | Noguchi | 385/33 |
| 8,600,236 | B2 * | 12/2013 | Shin et al. | 398/88 |
| 2003/0198444 | A1 * | 10/2003 | Mine et al. | 385/89 |
| 2005/0141823 | A1 * | 6/2005 | Han et al. | 385/89 |
| 2011/0097037 | A1 * | 4/2011 | Kuznia et al. | 385/33 |
| 2012/0008899 | A1 * | 1/2012 | Morioka | 385/33 |
| 2012/0263416 | A1 * | 10/2012 | Morioka | 385/33 |
| 2013/0330230 | A1 * | 12/2013 | Uri et al. | 422/69 |

FOREIGN PATENT DOCUMENTS

JP      2006-344915 A * 12/2006

* cited by examiner

*Primary Examiner* — Mike Stahl
(74) *Attorney, Agent, or Firm* — Novak Druce Connolly Bove + Quigg LLP

(57) ABSTRACT

An optical coupling lens includes a light incident surface, a light output surface perpendicular to the light incident surface, a reflection surface interconnected between the light incident surface and the light output surface, a first converging lens and a second converging lens formed on the light incident surface, and third converging lens formed on the light output surface and has a semi-cylindrical shape. Optical axes of the first converging lens and the second converging lens are perpendicular to the light incident surface and located on a common imaginary plane. A central axial plane of the third converging lens is perpendicular to the light output surface. An intersecting line between the central axial plane and the common imaginary plane is located on the reflection surface. A width of the third converging lens is equal to a diameter of each of the first converging lens and the second converging lens.

4 Claims, 3 Drawing Sheets

OPTICAL COUPLING LENS

BACKGROUND

1. Technical Field

The present disclosure relates to optics and, particularly, to an optical coupling lens.

2. Description of Related Art

An optical coupling lens is preferred for use in data transmission between electronic devices due to its high transmission speed and signal integrity. The optical coupling lens is formed by injection molding die and includes a light incident surface, a light output surface perpendicular to the light incident surface, a reflection surface obliquely interconnected between the light incident surface and the light output surface, a number of first converging lenses formed on the light incident surface, and a number of second converging lenses formed on the light output surface. The first converging lenses correspond to the second converging lenses one to one. The reflection surface is configured for reflecting light converged by the first converging lens to a corresponding second converging lens and reflecting light converged by the second converging lens to a corresponding first converging lens.

When a first optical axis of each of the first converging lenses intersects with a second optical axis of the corresponding second converging lens at a point on the reflection surface, light converged by the first converging lens entirely enters the corresponding second converging lens. Whereas, the first optical axis can not intersect with the second optical axis and offsets relative to the second optical axis in two directions, for example, a first direction is in X axis and a second direction is in Y axis perpendicular to the X axis, and the X axis and the Y axis are in a same plane. In order to correct the offsets in two directions, the offset in the first direction is first adjusted, and then the offset in the second direction is adjusted. However, when the offset in the second direction is adjusted, a new offset in the first direction may be occurred. Thus, it is difficult to correct the offsets in two directions.

Therefore, it is desirable to provide an optical coupling lens, which can overcome or at least alleviate the limitations described.

DETAILED DESCRIPTION

Figure 1:
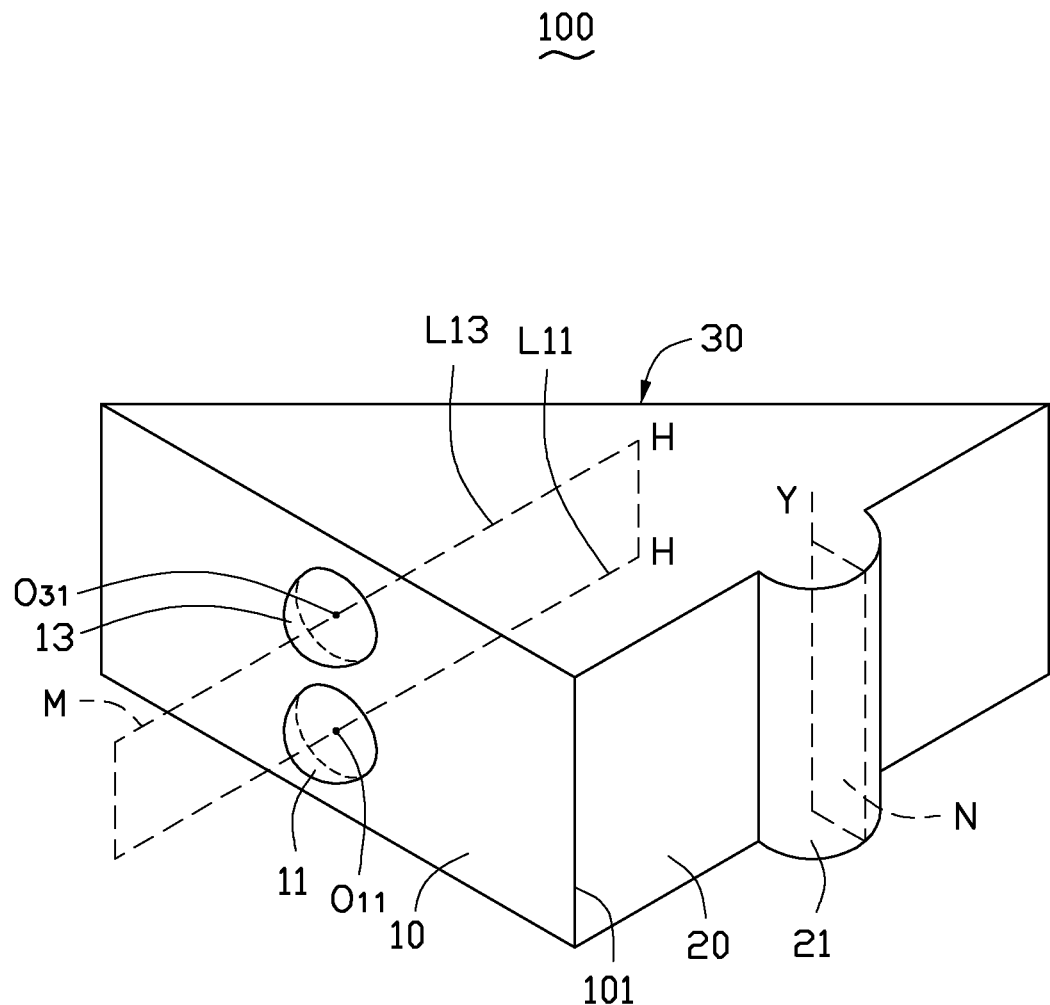
FIG. 1 is a schematic, isometric view of an optical coupling lens including a first converging lens, a second converging lens, and a third converging lens, according to an exemplary embodiment.
Figure 2:
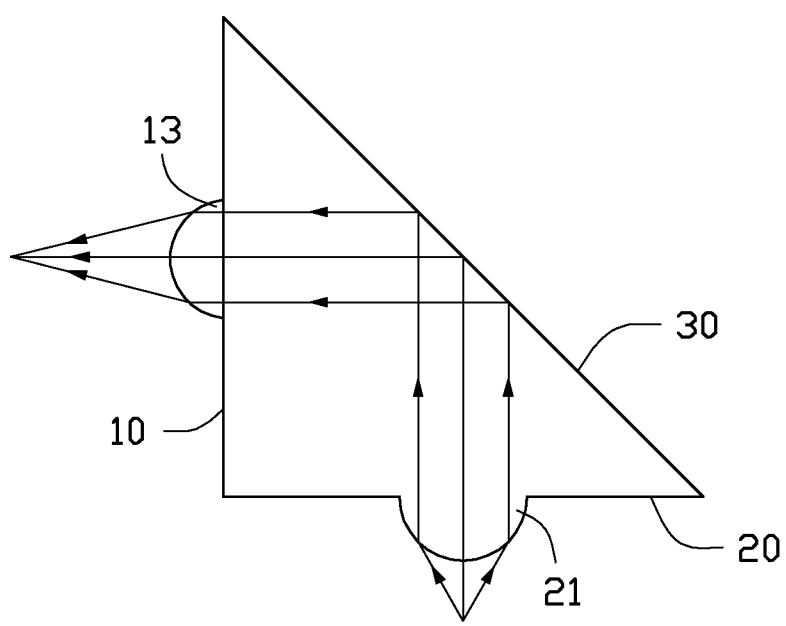
FIG. 2 shows a light path of the optical coupling lens of FIG. 1.

FIG. 1 shows an optical coupling lens 100 according to an exemplary embodiment. The optical coupling lens 100 is substantially a triangular prism and includes a light incident surface 10, a light output surface 20, a reflection surface 30, a first converging lens 11, a second converging lens 13, and a third converging lens 21.

The light incident surface 10 is perpendicular to the light output surface 20. The light incident surface 10 intersects with the light output surface 20 to form an intersecting line 101. The reflection surface 30 is obliquely interconnected between the light incident surface 10 and the light output surface 20. An included angle between the reflection surface 30 and the light incident surface 10 is 45 degrees, and an included angle between the reflection surface 30 and the light output surface 20 is 45 degrees.

The first converging lens 11 and the second converging lens 13 are positioned at the light incident surface 10 and apart from each other. The first converging lens 11 and the second converging lens 13 are circular spherical lenses. The center $O_{11}$ of the first converging lens 11 and the center $O_{31}$ of the second converging lens 13 are arranged in a line parallel to the intersecting line 101. An optical axis L11 of the first converging lens 11 and an optical axis L13 of the second converging lens 13 are perpendicular to the light incident surface 10 and located on a common imaginary plane M. The common imaginary plane M intersects with the reflection surface 30, and an intersecting line HH is formed between the common imaginary plane M and the reflection surface 30. The common imaginary plane M is parallel to the light output surface 20.

Figure 3:
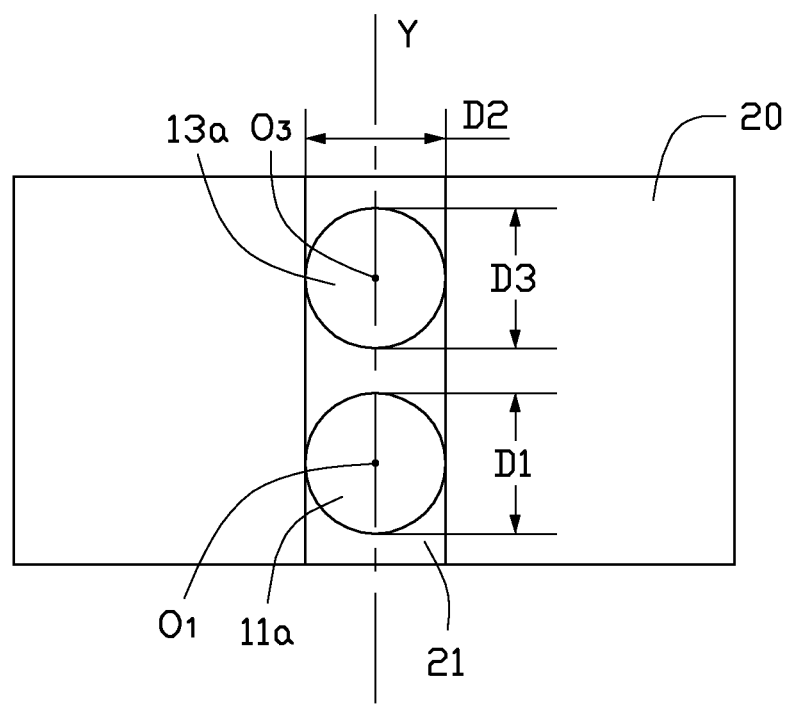
FIG. 3 shows the relationship between the first converging lens, the second converging lens, and the third converging lens.

Referring to FIG. 3, the first converging lens 11 projects on the light output surface 20 to form a first projection 11a after the first converging lens 11 is rotated at 90 degrees around the intersecting line HH. The second converging lens 13 projects on the light output surface 20 to form a second projection 13a after the second converging lens 13 is rotated at 90 degrees around the intersecting line HH.

Referring to FIGS. 1 and 3, the third converging lens 21 is substantially a semi-cylindrical spherical lens and formed on the light output surface 20. The central axis Y of the third converging lens 21 is on the light output surface 20 and parallel to the intersecting line 101. The length of the third converging lens 21 is equal to the length of the intersecting line 101. The lengthwise direction of the third converging lens 21 is the same as the lengthwise direction of the central axis Y, the lengthwise direction of the intersecting line 101, and parallel to the common imaginary plane M. The center $O_1$ of the first projection 11a and the center $O_2$ of the second projection 13a are arranged on the central axis Y at any position, and the third converging lens 21 covers the first projection 11a and the second projection 13a. In this embodiment, the width of the third converging lens 21 is equal to a diameter of each of the first converging lens 11 and the second converging lens 13. That is, a diameter of each of the first projection 11a and the second projection 13a is equal to the width of the third converging lens 21. In other words, a central axial plane N of the third converging lens 21 is perpendicular to the light output surface 20, and the central axial plane N intersects with the common imaginary plane line at the intersecting line HH.

Referring to FIG. 3, when in use, light converged by the third converging lens 21 is reflected by the reflection surface 30 toward the first converging lens 11, and then reaches on a light receiving module (not shown). Similarly, light converged by the second converging lens 13 is reflected by the reflection surface 30 toward the third converging lens 21, and then enters an optical fiber (not shown).

In the optical coupling lens 100, the center $O_1$ of the first projection 11a and the center $0_2$ of the second projection 13a just offset relative to the third converging lens 31 in a X axis perpendicular to the central axis Y axis due to the center $O_1$ of the first projection 11a and the center $O_2$ of the second projection 13a can be positioned at any position on the central axis Y. Thus, it is easy to correct the offset in X axis.

Even though numerous characteristics and advantages of the present embodiments have been set forth in the foregoing description, together with details of the structures and functions of the embodiments, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An optical coupling lens, comprising:
   a light incident surface;
   a light output surface perpendicular to the light incident surface;
   a reflection surface obliquely interconnected between the light incident surface and the light output surface, an included angle between the reflection surface and the light incident surface being 45 degrees, and an included angle between the reflection surface and the light output surface being 45 degrees;
   a first converging lens and a second converging lens formed on the light incident surface, optical axes of the first converging lens and the second converging lens being perpendicular to the light incident surface and located on a common imaginary plane;
   a third converging lens formed on the light output surface and has a semi-cylindrical shape, a central axial plane of the third converging lens being perpendicular to the light output surface, an intersecting line between the central axial plane and the common imaginary plane being located on the reflection surface, a width of the third converging lens being equal to a diameter of each of the first converging lens and the second converging lens.

2. The optical coupling lens as claimed in claim 1, wherein a lengthwise direction of the third lens is parallel to the common imaginary plane.

3. The optical coupling lens as claimed in claim 1, wherein the first converging lens and the second converging lens are circular spherical lenses.

4. The optical coupling lens as claimed in claim 1, wherein the common imaginary plane is parallel to the light output surface.

* * * * *